United States Patent
Crimmins et al.

(10) Patent No.: US 12,500,922 B2
(45) Date of Patent: Dec. 16, 2025

(54) ROBUST ELECTION LOGIC AND ACCURACY

(71) Applicants: REGENTS OF THE UNIVERSITY OF MICHIGAN, Ann Arbor, MI (US); THE BOARD OF TRUSTEES OF THE UNIVERSITY OF ILLINOIS, Urbana, IL (US)

(72) Inventors: Braden L. Crimmins, Ann Arbor, MI (US); John Alexander Halderman, Ann Arbor, MI (US); Bradley Sturt, Urbana, IL (US)

(73) Assignees: REGENTS OF THE UNIVERSITY OF MICHIGAN, Ann Arbor, MI (US); The Board of Trustees of the University of Illinois, Urbana, IL (US)

( * ) Notice: Subject to any disclaimer, the term of this patent is extended or adjusted under 35 U.S.C. 154(b) by 104 days.

(21) Appl. No.: 18/394,391

(22) Filed: Dec. 22, 2023

(65) Prior Publication Data
US 2024/0214408 A1   Jun. 27, 2024

Related U.S. Application Data

(60) Provisional application No. 63/434,873, filed on Dec. 22, 2022.

(51) Int. Cl.
 *H04L 9/40* (2022.01)
 *G07C 13/00* (2006.01)

(52) U.S. Cl.
 CPC .......... *H04L 63/1433* (2013.01); *G07C 13/00* (2013.01); *G06Q 2230/00* (2013.01)

(58) Field of Classification Search
None
See application file for complete search history.

(56) References Cited

U.S. PATENT DOCUMENTS

| | | |
|---|---|---|
| 11,080,959 B1 | 8/2021 | Gonzalez |
| 11,711,383 B2 | 7/2023 | Deardorff et al. |
| 2003/0062411 A1* | 4/2003 | Chung ............... G06Q 10/10 235/386 |
| 2007/0040027 A1* | 2/2007 | Morales ............... G07C 13/00 235/386 |
| 2016/0284150 A1* | 9/2016 | DeLongchamp ...... G07C 13/00 |
| 2020/0160640 A1* | 5/2020 | Ruskin ................ G06Q 50/26 |
| 2020/0242872 A1* | 7/2020 | Deutsch ............. G06F 16/9035 |
| 2021/0150542 A1* | 5/2021 | Loyd ................... G06K 7/1413 |
| 2021/0358253 A1* | 11/2021 | White .................. H04L 9/0618 |
| 2022/0101046 A1 | 3/2022 | Lin et al. |

\* cited by examiner

*Primary Examiner* — Raqiul A Choudhury
(74) *Attorney, Agent, or Firm* — MARSHALL, GERSTEIN & BORUN LLP

(57) ABSTRACT

A transposition error may occur in a voting machine when the voting machine switches candidates so that votes are counted for a different candidates than a voter intended. Such transposition errors may occur due to either intentional manipulation (e.g., a bad actor hacking the voting system, etc.), or unintentional human error (e.g., an unintentional human error in computer programming, etc.). In some embodiments, a "minimum test deck" is created that includes the minimum number of filled out ballots that will effectively test a voting machine to ensure that no transposition error occurred.

20 Claims, 6 Drawing Sheets

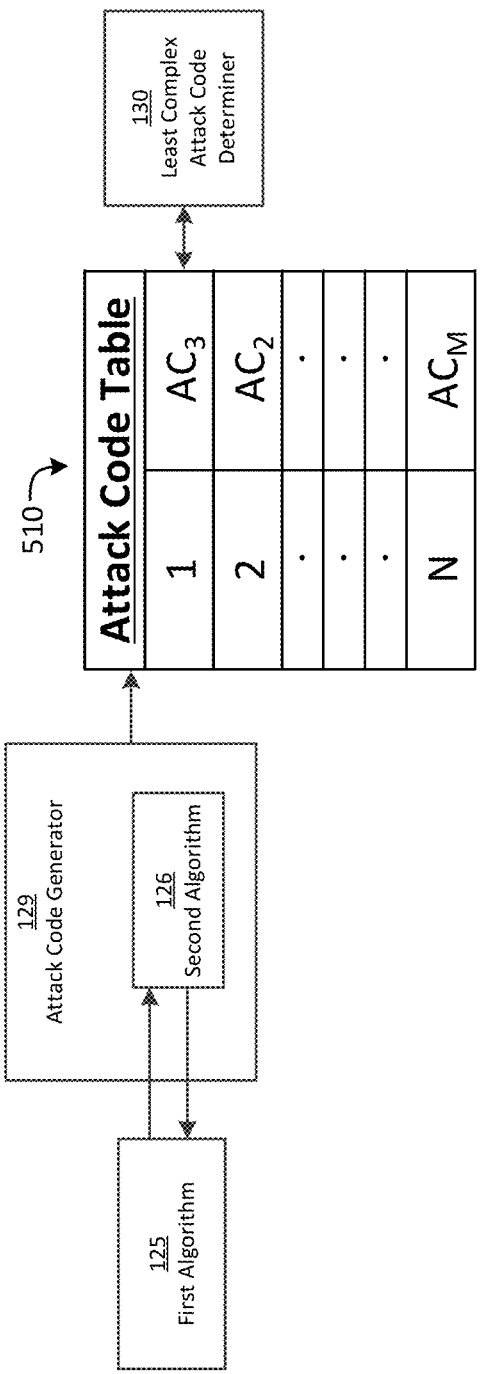

ROBUST ELECTION LOGIC AND ACCURACY

CROSS REFERENCE TO RELATED APPLICATIONS

This application claims the benefit of U.S. Provisional Application No. 63/434,873, entitled "Robust Election Logic and Accuracy" (filed Dec. 22, 2022), the entirety of which is incorporated by reference herein.

STATEMENT OF GOVERNMENT INTEREST

This invention was made with government support under 1518888 awarded by the National Science Foundation. The government has certain rights in the invention.

BACKGROUND

When a voting machine is working properly, the voting machine may be fed filled-out ballots, and, when voting is complete, will print out the correct number of votes that were cast for each candidate based on the ballots that were fed into the machine. However, various different types of errors may occur in this process. One such error is known as a transposition error, which occurs when the voting machine switches candidates so that votes are counted for different candidates than a voter intended. Transposition errors in voting systems may occur due to either intentional manipulation (e.g., a bad actor hacking the voting system, etc.), or unintentional human error (e.g., an unintentional human error in computer programming, etc.). In addition, it should be appreciated that transposition errors are only one kind of error among many kinds of errors that may occur in voting machines.

Currently, to attempt to detect if a voting system has an error, voting machines are fed, by an administrator, a "test deck" comprised of a small number of filled-out ballots. The administrator then checks whether the printout of the voting machine (i.e., the number of votes that the voting machine recorded for each candidate) matches the number of votes that were cast for each candidate in the test deck. If there exists a candidate for which the number of votes in the printout of the voting machine does not match the number of votes for that candidate that were cast in the test deck, then it is concluded that the voting machine should not be used in the election. This process is sometimes referred to as logic and accuracy testing ("L&A testing").

The systems and methods disclosed herein provide solutions to these problems and others.

SUMMARY

The following relates generally to building a test deck to check an electronic voting system.

In one aspect, a computer-implemented method for use in checking a voting system may be provided. The method may include: receiving, via one or more processors, election information comprising information of: (i) contests of an election, and (ii) at least one candidate for each contest; generating, via the one or more processors, an attack code subset from a class of attack codes based on the: (i) contests of the election, and (ii) at least one candidate for each contest; and until a second algorithm determines that a minimum test deck comprising a plurality of ballots may not be defeated by the attack code subset, at each iteration of a plurality of iterations: routing, via the one or more processors, the attack code subset into a first algorithm to determine the minimum test deck configured to defeat the attack code subset; routing, via the one or more processors, the minimum test deck into the second algorithm to determine an additional attack code that defeats the determined minimum test deck; and updating, via the one or more processors, the attack code subset to include the additional attack code.

In another aspect, a computer-implemented method for use in checking a voting system may be provided. The method may include: receiving, via one or more processors, election information comprising information of: (i) contests of an election, and (ii) at least one candidate for each contest; generating, via the one or more processors, an attack code subset from a class of attack codes based on the: (i) contests of the election, and (ii) at least one candidate for each contest; routing, via the one or more processors, the attack code subset into a first algorithm to determine a minimum test deck configured to defeat the attack code subset, wherein the minimum test deck comprises a plurality of ballots; routing, via the one or more processors, the minimum test deck into a second algorithm to determine an additional attack code that defeats the determined minimum test deck; updating, via the one or more processors, the attack code subset to include the additional attack code; and routing, via the one or more processors, the updated attack code subset into the first algorithm to determine an updated minimum test deck configured to defeat the updated attack code subset.

In yet another aspect, a system for error detection may be provided. The system may include: one or more processors; and one or more memories. The one or more memories may have stored thereon computer-executable instructions that, when executed by the one or more processors, cause the computing device to: receive election information comprising information of: (i) contests of an election, and (ii) at least one candidate for each contest; generate an attack code subset from a class of attack codes based on the: (i) contests of the election, and (ii) at least one candidate for each contest; and until a second algorithm determines that a minimum test deck comprising a plurality of ballots may not be defeated by the attack code subset, at each iteration of a plurality of iterations: route the attack code subset into a first algorithm to determine the minimum test deck configured to defeat the attack code subset; route the minimum test deck into the second algorithm to determine an additional attack code that defeats the determined minimum test deck; and update the attack code subset to include the additional attack code.

BRIEF DESCRIPTION OF THE DRAWINGS

FIG. 6 illustrates an embodiment where the second algorithm is contained in the attack code generator.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

Figure 2:
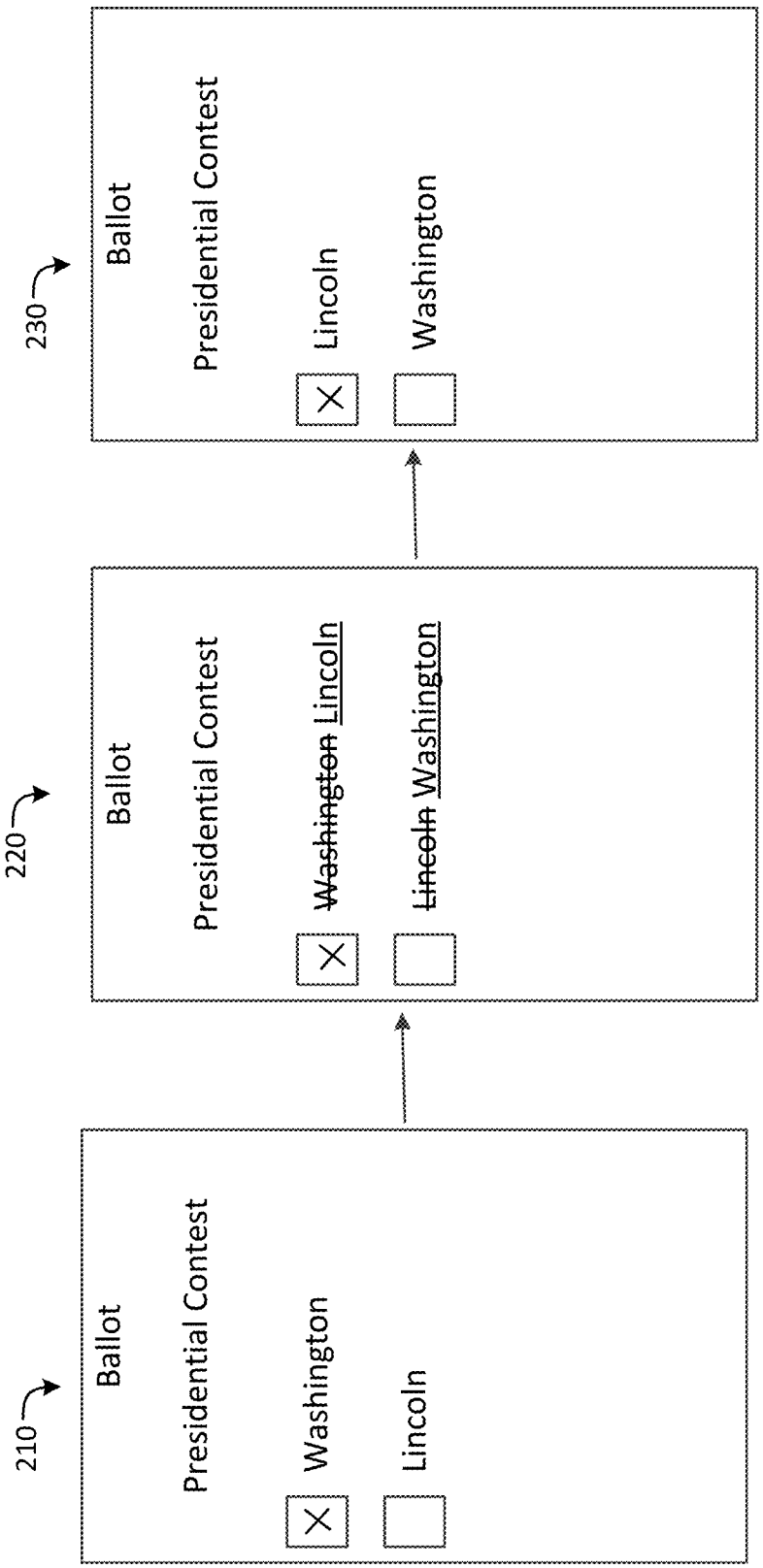
FIG. 2 illustrates an example of a transposition error.

Current electronic voting systems are vulnerable to transposition errors. In a transposition error, a voting machine switches two or more candidates' positions on the ballot. For instance, the example of FIG. 2 shows a presidential contest between Washington and Lincoln. In this example, ballot representation 210 depicts the ballot that is displayed to voters (e.g., a ballot with Washington on the top, and Lincoln on the bottom), and where a voter has voted for Washington. However, due to a transposition error, the voting machine swaps Lincoln and Washington, as illustrated by transposition error illustration 220. Thus, because of the transposition error, the internal workings of the voting machine see the vote as for Lincoln, as illustrated in representation 230. That is, the internal workings of the voting machine see the representation 230, and not the representation 210. As this shows, in this example, votes intended for Washington go to Lincoln, and vice versa. It may be noted that transposition errors may occur due to either intentional manipulation (e.g., a bad actor hacking the voting system, etc.), or unintentional human error (e.g., an unintentional human error in computer programming, etc.).

In a known system that attempts to detect transposition errors, an administrator feeds a "test deck" comprised of a small number of filled-out ballots into a voting machine. The administrator then checks whether the printout of the voting machine (i.e., the number of votes that the voting machine recorded for each candidate) matches the number of votes that were cast for each candidate in the test deck. If there exists a candidate for which the number of votes in the printout of the voting machine does not match the number of votes for that candidate that were cast in the test deck, then it is concluded that the voting machine should not be used in the election.

However, such previous systems were critically flawed because they did not construct test decks that caught all possible transposition errors. In particular, previous systems did not reliably catch transposition errors that swapped candidates across different contests in an election. For example, previous systems would not catch if a presidential candidate was switched with a senate candidate. In this regard, it should be appreciated that an election may be comprised of contests, such as a presidential contest, a senate contest, a house of representatives contest, a school board contest, a treasurer contest, an attorney general contest, and so on.

Figure 3:
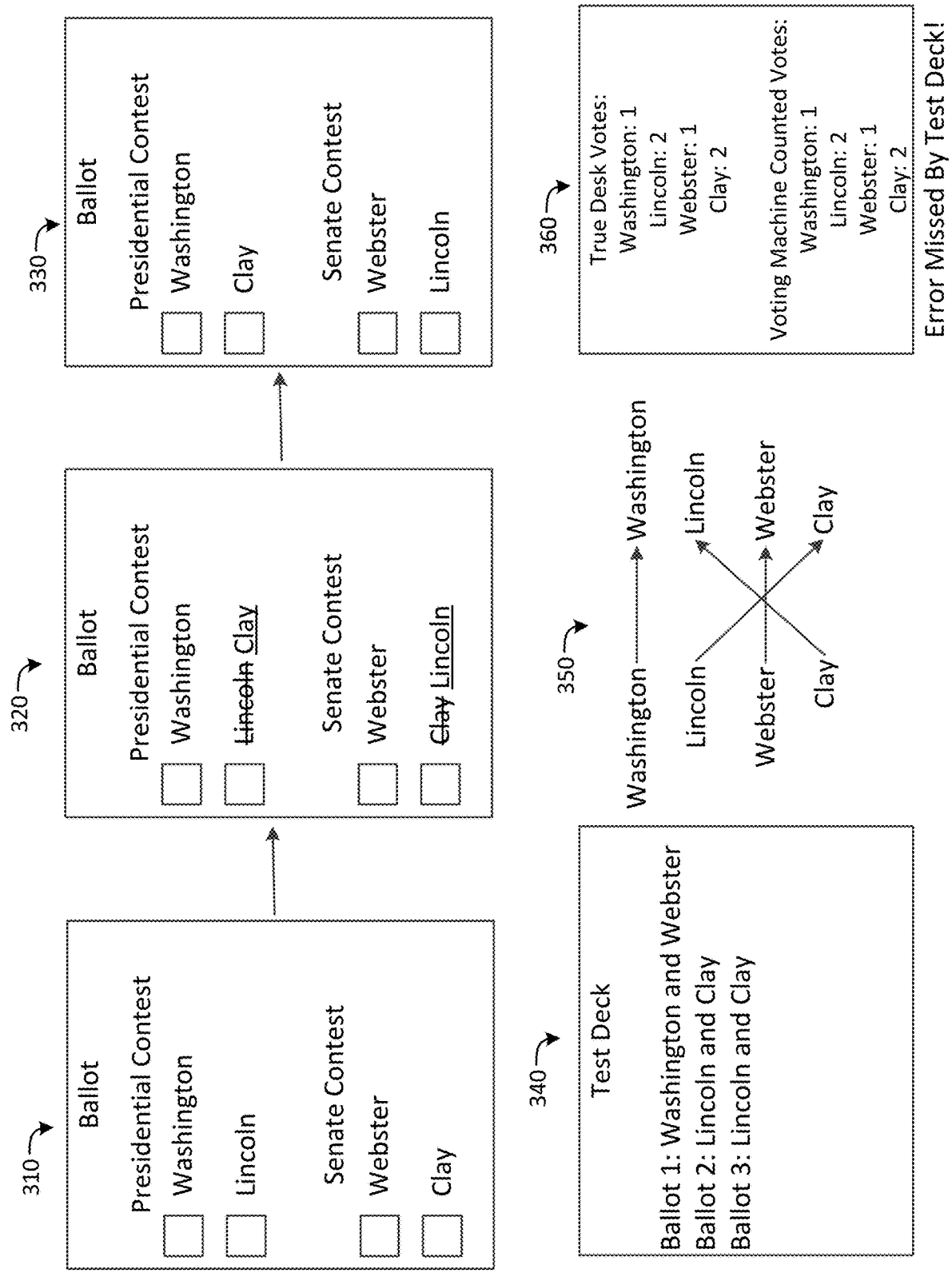
FIG. 3 illustrates an example of a transposition error across contests.

In one illustrative example, FIG. 3 depicts an example of a transposition attack across contests that example test deck 340 would not detect. In particular, ballot representation 310 is presented to a voter. However, due to a transposition error across contests, Lincoln (a presidential candidate) is swapped with Clay (a senate candidate), as shown in transposition error representation 320. Thus, because of the transposition error, the internal workings of the voting machine would see votes for Lincoln as votes for Clay, and vice versa, as illustrated in representation 330.

The example of FIG. 3 further illustrates the test deck 340, which includes: ballot 1 with a vote for Washington and a vote for Webster; ballot 2 with a vote for Lincoln and a vote for Clay; and ballot 3 also with a vote for Lincoln and a vote for Clay. Thus, the test deck 340 includes: 1 vote for Washington, 2 votes for Lincoln, 1 vote for Webster, and 2 votes for Clay. However, when the example test deck 340 is fed into a voting machine, the transposition error illustrated in 310-330 (i.e., the swapping of Lincoln and Clay) would go undetected. Specifically, the true test desk votes would match the votes that the voting machine counted from test deck 340, as shown in representation 360.

The following provides an elegant solution to this problem and others. In particular, some embodiments construct a test deck that can defeat every transposition "attack code." As discussed herein a transposition "attack code" refers to a particular swapping of candidates; for example, FIG. 2 illustrates a transposition attack code that swaps Washington and Lincoln.

Furthermore, some embodiments provide technical advantages as well. In a first technical advantage, some embodiments construct the test deck using an iterative process that specifically reduces the number of calculations (and therefore decrease the run time) it takes to construct the test deck. For example, a test deck constructed in accordance with embodiments described herein is based on less calculations than other potential techniques, such as a brute force method. In a second technical advantage, some embodiments construct a test deck that detects all possible transposition errors. In one such example, the previously known test deck construction techniques would not detect the transposition error of the example of FIG. 3; yet, the techniques described herein would construct a test deck that detects this error.

Example System

Figure 1:
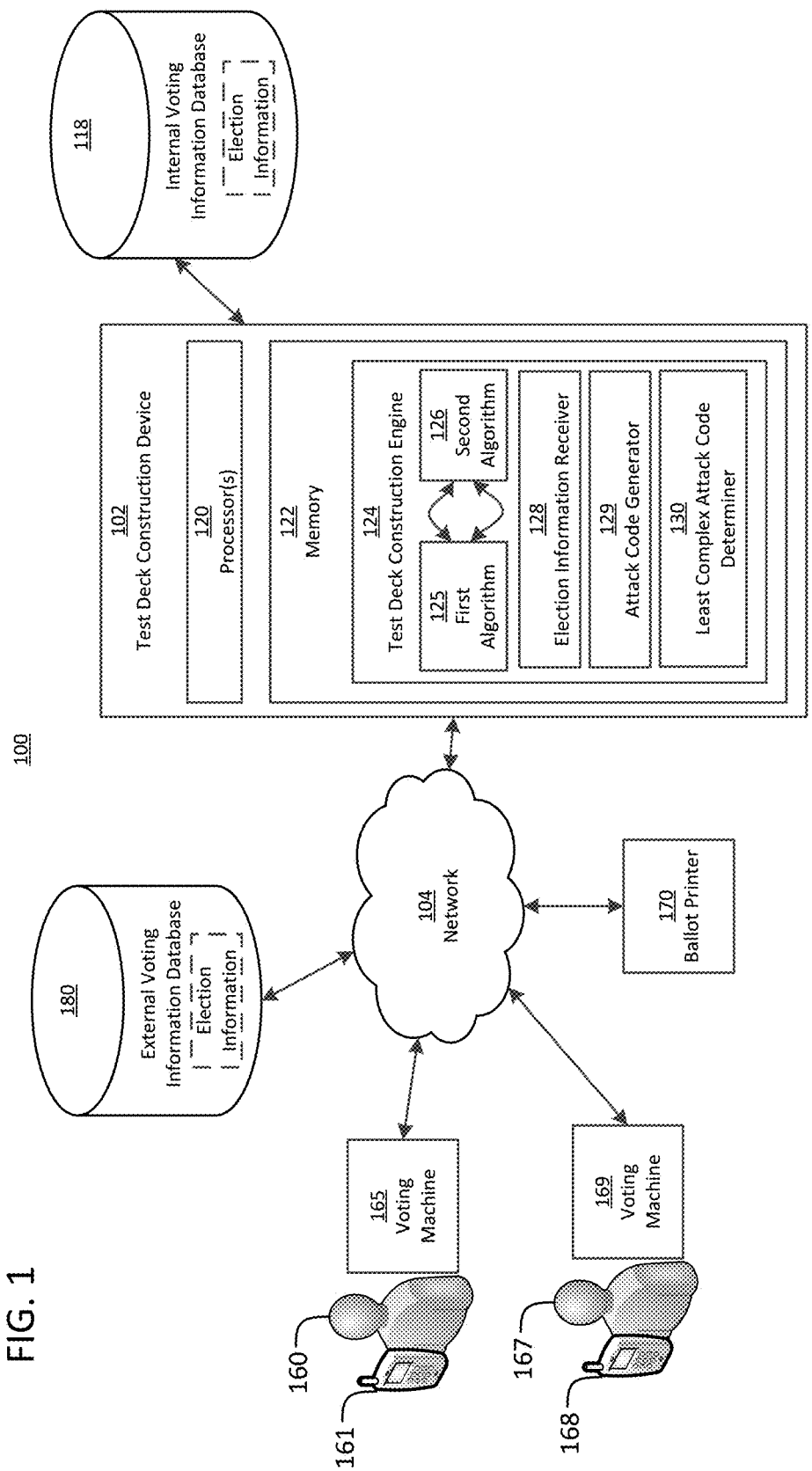
FIG. 1 shows a system for testing a voting machine, in an example.

FIG. 1 illustrates an example system 100 for testing a voting machine. The system 100 includes test deck construction device 102, which may perform techniques described herein to construct a test deck. The example system 100 also includes a voting machine 165 operated by a human administrator 160. The administrator 160 may feed the test deck constructed by the test deck construction device 102 into the voting machine 160 to detect errors and/or verify proper operation of the voting machine 160. In some embodiments, the voting machine 160 is connected to the test deck construction device 102 via a network 104 (which may be a wired or wireless network, such as the internet).

The test deck construction device 102 includes one or more processors 120, which may represent a CPU-type processing unit(s), a GPU-type processing unit(s), a field-programmable gate array (FPGA), another class of digital signal processor (DSP), or other hardware logic components that can be driven by a CPU. The test deck construction device 102 further includes memory 122, which may include executable computer-readable code stored thereon for programming a computer (e.g., comprising a processor(s) and GPU(s)) to the techniques herein. Examples of such computer-readable storage media include a hard disk, a solid state storage device/media, a CD-ROM, digital versatile disks (DVDs), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. The executable computer-readable code stored on the memory 122 may include instructions for executing various applications, such as test deck construction engine 124.

The test deck construction device 102 may be associated with any suitable entity. For example, the test deck construction device 102 may be owned by a government entity, such as a state, federal, or local government. In some such examples, the government may both construct the test deck (e.g., via the test deck construction device 102), and use the constructed test deck to check voting machine 165 (e.g., administrator 160 is a government employee, etc.). In another example, the test deck construction device 102 is associated with (e.g., owned by, etc.) a private company that manufactures the voting machine 102. In some such examples, this allows the private company to both manufacture the voting machine 165, and test the voting machine 165 with the test deck. In still other examples, the test deck construction device 102 is associated with (e.g., owned by, etc.) a private company that is separate from the company that manufactures the voting machine 165.

To construct test deck, the test deck construction device 102 (e.g., via the test deck construction engine 124, the one or more processors 120, etc.) may use any suitable information. For example, the test deck construction device 102 may use election information including information of: contests of the election, candidate(s) in each contest, maximum number of allowed votes per contest, etc. Furthermore, this information may be received by the test deck construction device 102 from any suitable source, such as the external voting information database 180 (e.g., a government database holding election information, etc.), internal voting information database 118 (e.g., a private database of a company of the test deck construction device, etc.). Additionally or alternatively, the election information may be held in the memory 122.

In some examples, the test deck is a paper test deck printed by the ballot printer 170. In some such examples, the administrator 160 receives the test deck from the ballot printer 170, and feeds the test deck into the voting machine 165 to test the voting machine 165. However, in other examples, the voting machine 165 may be a touch screen voting machine that receives votes by voters pressing the touch screen. In some such examples, the administrator 160 enters the test deck into the voting machine via touchscreen entry. In some such examples, an app on a mobile device of the administrator 160 displays instructions on how to fill out the ballots in accordance with the test deck (e.g., the mobile device receives instructions from the test deck construction device 102). In still other examples, the voting machine 165 receives the test deck electronically from the test deck construction device (e.g., via network 104).

The administrator 161 may be equipped with an administrator computing device 161, such as a smart phone, a laptop, a tablet, etc. The administrator computing device 161 may include one or more administrator computing device processors.

The system 100 may further comprise second voting machine 169, which may comprise the same or alternative components to the voting machine 165, and may be operated by second administrator 167. The second administrator 167 may be equipped with a second administrator computing device 168, such as a smart phone, a laptop, a tablet, etc. The second administrator computing device 168 may include one or more administrator computing device processors. The voting machines 165, 169 may be in the same or different precincts; the same or different jurisdictions; etc.

It should be appreciated that the test deck may be applied at any point in the voting process to effectively detect a transposition error. For example, the test deck may be applied before voting has begun, during voting, after voting is complete, etc.

In some embodiments, the test deck construction engine 124 includes a first algorithm 125, and a second algorithm 126. As will be described in further detail below, in some embodiments, the first algorithm 125 determines a minimum test deck that defeats a subset of attack codes; and the second algorithm 126 determines an attack code that defeats the minimum test deck determined by the first algorithm 125.

To aid in test deck construction, the test deck construction engine 124 may further include election information receiver 128. In some embodiments, the election information receiver 128 receives election information including information of: (i) contests of an election, and/or (ii) at least one candidate for each contest.

The test deck construction engine 124 further includes attack code generator 129 to generate attack codes using the received election information, as will be described elsewhere herein.

The test deck construction engine 124 further includes least complex attack code determiner 130. In some embodiments, the least complex attack complex attack code determiner 130 receives a set of attack codes, and determines the least complex attack code in the set (e.g., by determining the attack code from the set of attack codes with the least number of candidate switches). Advantageously, as will be described in further detail below, determining the least complex attack code may be leveraged to greatly reduce the overall processing time, and computational resources required to determine the minimum test deck. In addition, although the example of FIG. 1 illustrates the least complex attack code determiner 130 as separate from the first algorithm 125 and the second algorithm 126, in some embodiments one or both of the first algorithm 125 and/or the second algorithm 126 may include a least complex attack code determiner 130.

Moreover, the example system 100 may have other measures of security, as well. For instance, only authorized elections officials may have access to components of the system 100, for example, using authorized user login. In addition, all traffic on any of the components in the example system 100 may be monitored for unauthorized access attempts. Furthermore, there may be routine backups of data created that may be later used to determine if data has been manipulated or changed. Furthermore, an overall authentication and encryption engine may be implemented to protect components of the system 100 against local or network attacks.

In addition, although the example system 100 illustrates only one of many of the components, any number of components are contemplated (e.g., any number of test deck construction devices, administrators, voting machines, ballot printers, voting information databases, etc.).

Furthermore, some embodiments account for when a ballot is marked with more votes than is allowed for a particular contest. For example, in a presidential contest, voters may be allowed to vote for only one candidate. Thus, in some jurisdictions, if more than one candidate for the presidential contest is marked on the ballot, a vote for president is not counted from the ballot. This is sometimes referred to as the overvote rule.

Overview of Example Method

Figure 4:
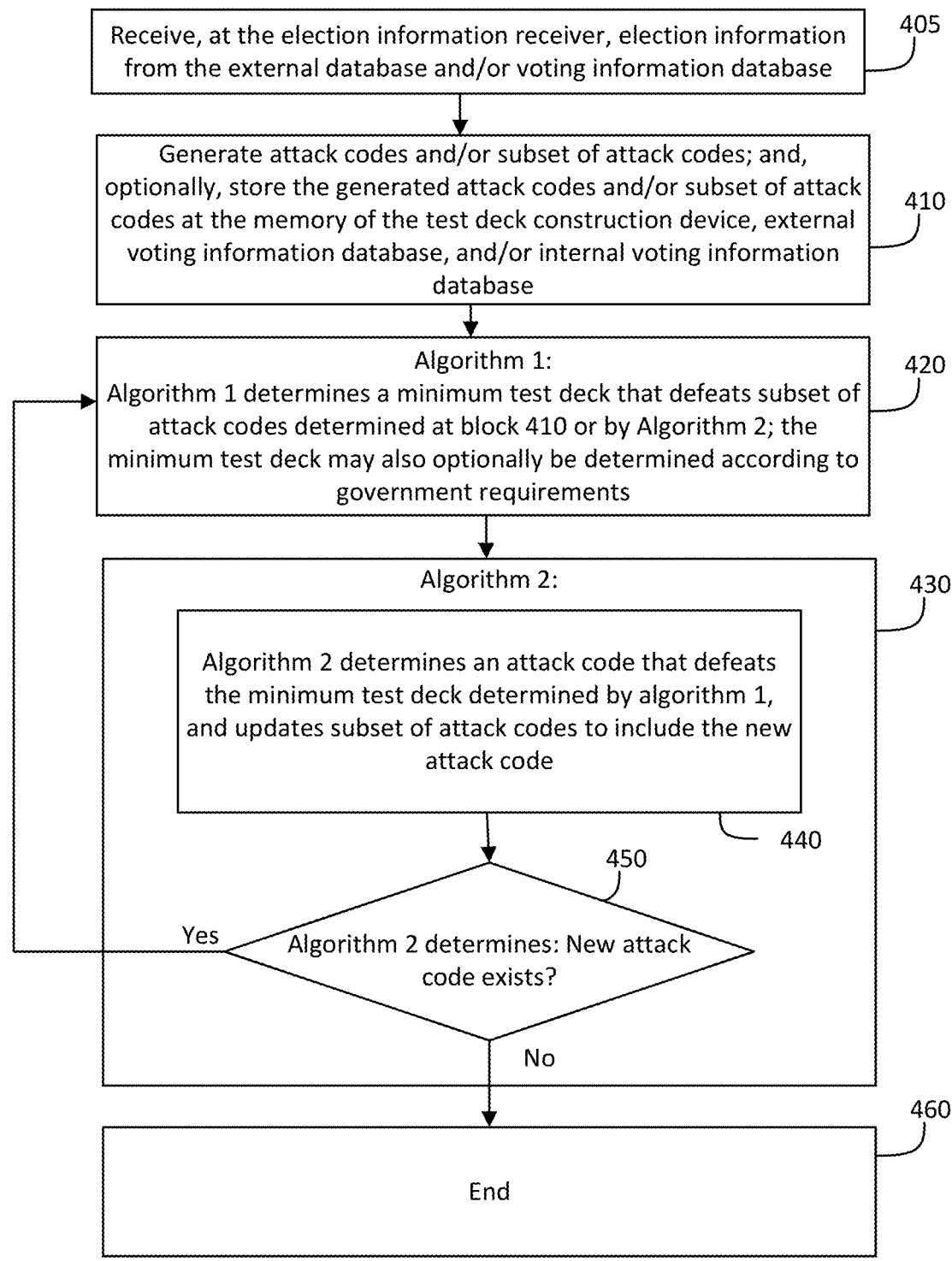
FIG. 4 illustrates an example overview flowchart of a method for constructing a test deck.

FIG. 4 illustrates an example overview flowchart 400 of a method for constructing a test deck. Each of the blocks of the flowchart 400 will be discussed below in more detail elsewhere herein. However, initially, in the following paragraphs, a broad overview of each block will be given. In some embodiments, the example method 400 may be performed by the test deck construction device 102 (e.g., via the test deck construction engine 124, the one or more processors 120, etc.).

The example method begins at block 405, where the one or more processors 120 receive (e.g., with the election information receiver 128) election information (e.g., from the external voting information database 180 and/or the internal voting information database 118). The election information may include any suitable information, such as information of: contests of the election, candidate(s) in each contest, maximum number of allowed votes per contest, test deck requirements made by a government (e.g., a state, local, federal government, etc.), attack codes, a particular class of attack codes (e.g., a subset of attack codes), etc.

At block 410, the one or more processors 120 generate attack codes or a subset of attack codes from a class of attack codes. Examples of classes of attack codes include: one-to-one transposition attack codes (e.g., as in the examples of FIGS. 2 and 3); one-to-many transposition attack codes (e.g., one candidate is switched into the position of more than one other candidate); and many-to-one transposition attack codes (e.g., more than one candidate is switched into the position of a single other candidate). In some examples, a human manually selects the class of attack codes based on knowledge of the inner workings of a voting machine 165 (e.g., a particular type of voting machine includes programming that is particularly vulnerable to one-to-many attacks, etc.). In other examples, the one or more processors 120 automatically select the class of attack codes based on the type of voting machine. For example, some types of voting machines may react differently to different classes of attack codes. More specifically, most voting machines react the same to a one-to-one transposition attack. However, different types of voting machines often react differently to one-to-many transpositions attacks, and/or to many-to-one transposition attacks. For instance, some types of voting machines would record votes for multiple candidates in response to a one-to-many transposition attack, while other types of voting machines would be able to detect the one-to-many transposition attack (e.g., and thus not record votes, generate an alarm, etc.).

The attack codes and related information (e.g., classifications of attack codes, subsets of attack codes, uncertainty set(s), etc.) may be stored in any suitable location, such as the internal voting information database 118, the memory 122, the external voting information database 180, etc. In some embodiments, the subset of attack codes are stored in memory (e.g., the internal voting information database 118, the memory 122, the external voting information database 180, etc.) as a set of instantiations from that class. In some examples, the subset of attack codes comprise data representation of the expected abnormal behavior if the given attack codes were each conducted; for example, (1) the attack code where the first and third candidates have their targets swapped, (2) the attack code where the first candidate's target goes to candidate seven, candidate seven's target goes to candidate two, and candidate two's target goes to candidate one, etc. In some examples, the subset of attack codes are stored as a table.

Figure 5:
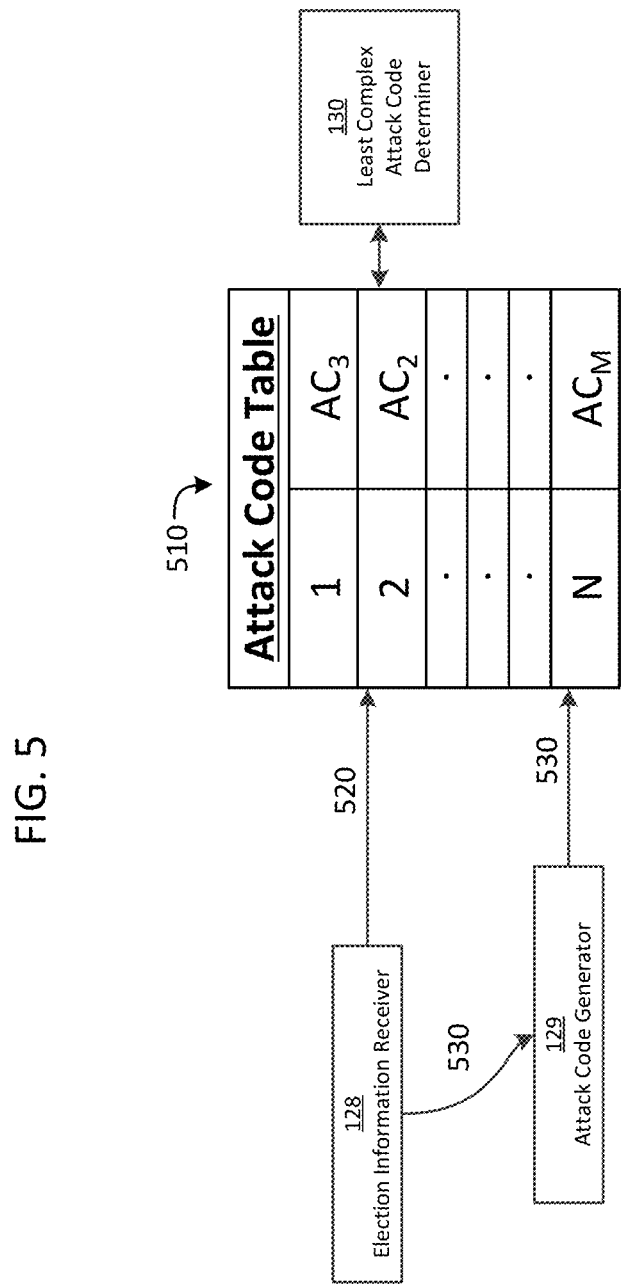
FIG. 5 illustrates two example paths for generating an example table of attack codes.

FIG. 5 illustrates two example paths 520, 530 for generating an example table of attack codes 510. For the first path 520, the subset of attack codes are generated by receiving them at the election information receiver. For example, the subset of attack codes may be contained within in the election information received from the external voting information database 180. For example, in addition to information contest information and candidate information, attack codes may be contained within the election information. This would allow individual election officials, municipalities, election oversight organizations, etc. to define an initial set of attack codes to be resolved for their particular election, for example, based on the contest and candidate information, the types of voting machines, etc.

For the second path 530, the attack code generator 129 may generate the subset of attack codes from the election information sent from the election information receiver 128. For example, the subset of attack codes may be generated from the information of: (i) contests of an election, and (ii) at least one candidate for each contest. For instance, as described above with respect to FIG. 2, the attack code generator 129 may generate an attack code that swaps Washington and Lincoln.

Further regarding block 410, as with the other blocks of the example method 400, the particular techniques of generating the subset of attack codes (e.g., by the attack code generator 129 via path 530) will be discussed in more detail elsewhere herein. However, it should be appreciated that the subset may include one attack code, or more than one attack code. Moreover, at block 410, in some embodiments, the subset of attack codes is generated to be a least complex attack code; that is, an attack code that does the least number of switches between candidates.

In some embodiments, the attack code generator 129 generates the attack codes in order from least complex to most complex, and the least complex attack code may be thus determined to be the first attack code generated. In other embodiments, the attack code generator 129 does not determine the attack codes in order, and the least complex attack code is determined by the least complex attack code determiner 130. For example, the least complex attack code determiner 130 may search table 510 to find the least complex attack code. For instance, the least complex attack code determiner 130 may search tags in the table 510 that indicate the number of candidate swaps for the corresponding attack code. Additionally or alternatively, the least complex attack code determiner 130 may run an algorithm on any or all of the attack codes to determine the number of candidate swaps for the respective attack code.

Additionally or alternatively, the least complex attack code determiner 130 may rank the attack codes in order of complexity. For example, the least complex attack code determiner 130 may reorder the attack codes in the table 510 from least complex to most complex. For instance, if attack code $AC_3$ is less complex than attack code $AC_2$, the least complex attack code determiner 130 may place attack code $AC_3$ in a higher row than attack code $AC_2$, as in the example table 510.

In some embodiments, if there is more than one attack code that does the least number of candidate switches, the one or more processors 120 randomly select one attack code from this group of least complex attack codes to form the subset of attack codes at block 410.

Following block 410, broadly speaking, and as will be described in further detail elsewhere herein, blocks 420 and 430 operate in conjunction to solve the following robust optimization problem (specified below as eq. RO) for finding the minimum test deck:

$$\underset{B\in\mathbb{N},(\beta_1,\ldots,\beta_B)\in\mathcal{D}}{\text{minimize}} B \qquad \text{(RO)}$$

subject to $T(\beta_1, \ldots, \beta_B) \neq T^*(\beta_1, \ldots, \beta_B) \ \forall T(\cdot) \in \mathcal{U}$.

In eq. RO, the decision variables are the length of the test deck $B \in \mathbb{N}$ (with $\mathbb{N}$ meaning the set of natural numbers) as well as the ballots in a test deck of length B that satisfies the requirements specified by state law, $(\beta_1, \ldots, \beta_B) \in \mathcal{D}$. (in other words, $\mathcal{D}$ may be a set of test decks that satisfy the requirements given under state law.) The constraints of the optimization problem enforce that the test deck is feasible if and only if the output of the voting machine 165 on the test deck, $\hat{T}(\beta_1, \ldots, \beta_B)$, is different from the output of a voting machine 165 that functions correctly, $T^*(\beta_1, \ldots, \beta_B)$, whenever the voting machine 165 satisfies $\hat{T}(\bullet) \in \mathcal{U}$—that is, whenever the voting machine 165 functions according to an error included in the uncertainty set. The objective of the robust optimization is to minimize the number of ballots included in the test deck; this property is desirable from an implementation standpoint because longer decks introduce more difficulty for officials conducting the procedure. The eq. RO will be explained in further detail elsewhere herein.

At block 420, the one or more processors 120 use a first algorithm (algorithm 1; the first algorithm 125) to determine a minimum test deck that defeats the subset of attack codes. In some embodiments, algorithm 1 performs the following portion of eq. RO:

$$\underset{B \in \mathbb{N}, (\beta_1, \ldots, \beta_B) \in \mathcal{D}}{\text{minimize}} B$$

where: B is a length of a test deck; $\beta$ is a ballot; $(\beta_1, \ldots, \beta_B)$ is a deck of ballots; and $\mathcal{D}$ is a set of test decks that satisfy requirements for a particular jurisdiction. Further regarding $\mathcal{D}$, in some embodiments, the minimum test deck is also determined according to additional requirements (e.g., government requirements, such as state, local or federal requirements, such as received from the external voting information database 180 or internal voting information database 118), such as including a ballot marked in every possible space (e.g., a ballot including a vote for every candidate), including a blank ballot, etc. In this regard, $\mathcal{D}$ may be a set of test decks that satisfy the requirements given under state law. The above equation will be described in further detail elsewhere herein.

Subsequently, at block 430, the one or more processors 120 apply a second algorithm (algorithm 2; the second algorithm 126) to the determined minimum test deck. As illustrated by FIG. 4, block 430 has two sub-blocks, 440 and 450. At sub-block 440, the one or more processors 120 determine an attack code(s) that defeats the minimum test deck, and update the subset of attack codes to include the new attack code(s). In some embodiments, as will be described in further detail elsewhere herein, algorithm 2 determines one or more attack codes that defeat the minimum test deck by determining the portion of eq. RO not performed by algorithm 1. Namely, algorithm 2 determines:

subject to $T(\beta_1, \ldots, \beta_B) \neq T^*(\beta_1, \ldots, \beta_B) \ \forall T(\bullet) \in \mathcal{U}$.

The equation $T(\beta_1, \ldots, \beta_B) \neq T^*(\beta_1, \ldots, \beta_B)$, as well as $\forall T(\bullet) \in \mathcal{U}$ will be described in further detail elsewhere herein.

Moreover, in some embodiments, more than one attack code is determined to defeat the minimum test deck, but the test deck is updated with only one of the determined attack codes. Advantageously, as will be seen, this ultimately improves computational time in determining the final test deck.

More specifically, advantageously, in some embodiments, if more than one attack code is determined to defeat the minimum test deck, the one or more processors 120 may select the attack code in a way to reduce overall computational time, and thereby improve technical functioning. More particularly, the one or more processors 120 may select the least complex attack code (e.g., the attack code that does the least number of candidate switches) from the determined attack codes to update the minimum test deck with. In some embodiments, this is accomplished by the one or more processors 120 comparing (e.g., via the least complex attack code determiner 130) the number of candidate switches for each attack code determined to defeat the minimum test deck; and determining the least complex attack code to be the attack code with the least number of candidate switches.

If there is more than one such least complex attack codes, in some embodiments, the one or more processors 120 may randomly select one of the least complex attack codes to update the test deck with. Adding the least complex attack code to the subset may in turn cause the first algorithm to determine an updated minimum test deck that defeats a larger number of attackers, thereby reducing the number of iterations required to complete the process and therefore reducing overall computational time.

The one or more processors 120 may then return (via sub-block 450) to algorithm 1 at block 420 to determine a new minimum test deck that defeats the updated subset of attack codes. If no new attack code exists, the test deck is complete and the method ends at block 460.

In addition, in some embodiments, the second algorithm 126 is contained in the attack code generator 129, as illustrated by FIG. 6. For example, the attack code generator 129 may generate the subset of attack codes (e.g., block 410); the first algorithm 125 may then determine the minimum test deck that defeats the subset of attack codes (e.g., block 420); and then the second algorithm 126 (contained in the attack code generator 129; e.g., the second algorithm 126 acts as a sub module of the attack code generator 129) determines an attack code that defeats the minimum test deck (e.g., block 440). In this regard, in some embodiments, the second algorithm 126 comprises a dynamic attack code generator within the attack code generator 129. Similarly as described above, the least complex attack code determiner 130 may rank (e.g., reorder) the attack codes in the table 510.

In the example method 400, it should be noted that all blocks are not necessarily required to be performed. Moreover, additional blocks may be performed although they are not specifically illustrated in the example method 400.

Example Implementations

The following will discuss example implementations, such as example implementations of the example method 400. Consider an election composed of a set of contests $\mathcal{C} \triangleq \{1, \ldots, C\}$ and a set of candidates $\mathcal{N} \triangleq \{1, \ldots, N\}$. For each contest $c \in \mathcal{C}$, let $\mathcal{N}_c \subseteq \mathbb{N}$ be the subset of candidates that appear in contest c and let $v_c$ denote the maximum number of candidates in that contest that may be legally selected by a voter. For example, for a contest $c \in \mathcal{C}$ that corresponds to the senatorial election, the set $\mathcal{N}_C$ would contain the indices of the candidates that are running for Senator, and the equality $v_c = 1$ would denote that each voter is permitted to select at most one candidate in the contest. (In some elections, voters are permitted to vote for as many candidates in a contest as there are empty seats. In one such example, in a contest for a local school board with five vacancies, $v_c = 5$). Some embodiments assume that each candidate $i \in \mathcal{N}$ appears in exactly one contest.

A ballot refers to a subset of candidates $\beta \subseteq \mathcal{N}$ such that $i \in \beta$ if and only if the ballot contains a vote for candidate i. A deck refers to any finite-length sequence of ballots $(\beta_1, \ldots, \beta_B)$. A ballot is said to overvote contest $c \in \mathcal{C}$ if and only if more votes were cast in the contest than is allowed; that is, if $|\beta \cap \mathcal{N}_c| > v_c$. If a ballot overvotes contest $c \in \mathcal{C}$, it is commonly treated as if no selections were made in the contest. The set of ballots that do not overvote any contest may be denoted by $$\mathcal{B} \triangleq \{\beta \subseteq \mathfrak{B} : |\mathfrak{B}_c \cap \beta| \le v\} \text{ for all } c \in \mathcal{C}$$

When the voting machine 165 operates correctly, the voting machine 165 will take a deck as input, and will output the total number of votes received by each candidate in the ballots that do not have an overvote in that candidate's contest. For any input deck $(\beta_1, \ldots, \beta_B)$, the test deck construction engine 124 may denote the output of a voting machine 165 that operates correctly by the vector $T^*(\beta_1, \ldots, \beta_B) \equiv (T_1^*(\beta_1, \ldots, \beta_B), \ldots, T_N^*(\beta_1, \ldots, \beta_B))$, where $T_i^*(\beta_1, \ldots, \beta_B)$ is defined for each candidate $i \in N_C$ in each contest $c \in \mathcal{C}$ as $$T_i^*(\beta_1, \ldots, \beta_B) \triangleq \sum_{b \in \{1, \ldots, B\}} \mathbb{1}\{i \in \beta_b \text{ and } |\mathcal{N}_C \cap \beta| \le v_c\}$$

This tally may then be used to determine which candidate or candidates were elected.

Some embodiments leverage the following implementations of logic and accuracy (L&A) testing.

A properly operating voting machine 165 will tabulate ballots according to the function $T^*(\cdot)$ described above. On the other hand, to represent the behavior of a voting machine 165 that might not operate correctly, the following vector-valued function $\hat{T}(\cdot)$. This function, which may be written $\hat{T}(\beta_1, \ldots, \beta_B) \equiv (\hat{T}_1(\beta_1, \ldots, \beta_B) \ldots, \hat{T}_N(\beta_1, \ldots, \beta_B))$, represents the output of the voting machine for any deck of ballots $(\beta_1, \ldots, \beta_B)$. A machine operating under such a $\hat{T}(\cdot) \ne T^*(\cdot)$ could produce results inconsistent with the actual ballots cast, affecting the result of the election.

In a bid to ensure the proper functioning of voting machines, election officials in all fifty states engage in a testing practice called logic and accuracy (L&A) testing. This test procedure—which is often conducted at public events—is broadly intended to validate voting machine behavior and enhance public trust. The central idea of logic and accuracy is simple: after each machine has been configured for an upcoming election, election officials fill out a known set of votes (referred to as a test deck) and confirm that the resulting tally is as expected. Any discrepancy indicates that an error has occurred, which alerts officials to the fact that the machine is not operating as expected.

Implementations vary significantly by jurisdiction. State laws and regulations may govern anything from the timing of testing to the ways in which officials should respond when a discrepancy is observed; this disclosure, however, addresses variations in the substantive contents of the test deck.

Among the most basic requirements of L&A testing is that each candidate on the ballot should receive at least one vote; that is $T_i^*(\beta_1, \ldots, \beta_B) \ge 1$ for all $i \in \mathcal{N}$ for the selected test deck $(\beta_1, \ldots, \beta_B)$. This is currently required by at least forty states. In 17 of those states, there is the additional requirement that each candidate in a contest receive a different number of votes; that is, $T_i^*(\beta_1, \ldots, \beta_B) \ne T_j^*(\beta_1, \ldots, \beta_B)$ for all distinct $i, j \in \mathcal{N}_c$ for all $c \in \mathcal{C}$. Other requirements may exist as well; for example, some jurisdictions require that the deck must contain an overvoted ballot, or that the test deck must contain a completely blank ballot. This is referred to herein as the set of decks $(\beta_1, \ldots, \beta_B)$ that satisfy these requirements for a particular jurisdiction $\mathfrak{D}$.

These testing procedures differ broadly by jurisdiction due to a natural process of evolution over time. Some states have improved upon existing procedures to address the more complicated ways in which modern machines can be wrong; but, no state has procedures which reliably detect even basic potential flaws, or has explicitly defined the types of errors they seek to preclude.

To improve over prior approaches, this disclosure proposes an approach referred to herein as robust logic and accuracy testing. The following will introduce this approach, and discuss some of its advantages over the current practice.

In some embodiments, election officials or policy makers specify an uncertainty set of plausible ways that a voting machine can malfunction. (Thus, as used herein, an uncertainty set refers to a class of attack codes.) Given the uncertainty set as an input, the test deck construction engine 124 then solves a robust optimization problem to find a test deck that is guaranteed to reveal whether the voting machine 165 is malfunctioning in any of the ways specified by the uncertainty set. By conducting their test with a deck that satisfies this optimization problem, election officials gain a security guarantee that the voting machine 165 is not malfunctioning in any of the ways that were specified by their chosen uncertainty set.

In greater detail, let the uncertainty set of plausible ways that a voting machine can malfunction be denoted by the set $\mathcal{U}$. Each element of this uncertainty set is a vector-valued function $T(\cdot) \equiv (T_1(\cdot), \ldots, T_N(\cdot))$ corresponding to the behavior of the voting machine under a plausible and likely way that the voting machine can malfunction, where the criteria for a malfunction to be plausible is determined by election officials or policy makers. Later sections in this disclosure will specify a general and practically-relevant uncertainty set which captures a large number of malfunctions already identified as plausible by policymakers of voting machines currently used in the United States. Later sections will also provide a more detailed discussion regarding the selection of the uncertainty set.

Given an uncertainty set, some embodiments solve a robust optimization problem to find the minimum-length test deck that is guaranteed to identify whether the voting machine 165 is malfunctioning in any of the ways specified by the uncertainty set. The robust optimization problem for finding such a test deck is specified below as (RO):

$$\underset{B \in \mathbb{N}, (\beta_1, \ldots, \beta_B) \in \mathfrak{D}}{\text{minimize}} \quad B \qquad (\text{RO})$$

subect to $T(\beta_1, \ldots, \beta_B) \ne T^*(\beta_1, \ldots, \beta_B) \; \forall T(\cdot) \in \mathcal{U}$.

In the optimization problem (RO), the decision variables are the length of the test deck $B \in \mathbb{N}$ (with $\mathbb{N}$ meaning the set of natural numbers) as well as the ballots in a test deck of length B that satisfies the requirements specified by state law, $(\beta_1, \ldots, \beta_B) \in \mathfrak{D}$. (In other words, $\mathfrak{D}$ may be a set of test decks that satisfy the requirements given under state law.) The constraints of the optimization problem enforce that the test deck is feasible if and only if the output of the voting machine 165 on the test deck, $\hat{T}(\beta_1, \ldots, \beta_B)$, is different from the output of a voting machine 165 that functions correctly, $T^*(\beta_1, \ldots, \beta_B)$, whenever the voting machine 165 satisfies $\hat{T}(\cdot) \in \mathcal{U}$—that i whenever the voting machine 165 functions according to an error included in the uncertainty set. The objective of the robust optimization is to minimize the number of ballots included in the test deck; this property is desirable from an implementation standpoint because longer decks introduce more difficulty for officials conducting the procedure.

Furthermore, in some embodiments, algorithm 1 (e.g. performed at block 420 of FIG. 4) performs the $$\underset{B \in \mathbb{N}, (\beta_1, \ldots, \beta_B) \in \mathcal{D}}{\text{minimize}} B$$

subject to $T(\beta_1, \ldots, \beta_B) \neq T^*(\beta_1, \ldots, \beta_B)$ portion of (RO). And, in some embodiments, algorithm 2 (e.g., performed at block 430 of FIG. 4) determines an attack code that defeats the minimized test deck. Algorithm 2 may do this without considering the entire $\forall T(\bullet) \in \mathcal{U}$. That is, solving for the entire $\forall T(\bullet) \in \mathcal{U}$ would be too large for Algorithm 2 to solve, and thus, as will be described further below, a solution is found without considering all of $\forall T(\bullet) \in \mathcal{U}$ directly.

In summary, the robust optimization problem (RO) provides an algorithmic way to construct test decks that have powerful security guarantees with respect to a specified uncertainty set $\mathcal{U}$. By solving the problem, it is possible to obtain a minimal-length test deck $(\beta_1, \ldots, \beta_B)$ that simultaneously satisfies the requirements given under state law as well as satisfies the property that the output of a voting machine $\hat{T}(\beta_1, \ldots, \beta_B)$ that is guaranteed to differ from that of $T^*(\beta_1, \ldots, \beta_B)$ if the voting machine 165 is misconfigured along one of the ways specified by the uncertainty set.

This disclosure next discusses rationale and potential significance of robust logic and accuracy testing from four different perspectives. Namely, the perspective of the election security community, the perspective of election administrators, the perspective of policy makers, and the perspective of voters. By exploring these four perspectives, this disclosure aims to show that robust logic and accuracy testing has the potential to be a valuable and implementable solution from the perspective of key stakeholders in the administration of elections.

In the election and cyber security communities, risk is defined and minimized by considering a hypothetical adversary. This adversary aims to interfere with a system, and is constrained by a threat model which specifies the scope of their capabilities. This allows for the development of security interventions which have a definite effect with respect to certain assumptions about attacker capabilities.

The formulation in (RO) works constructively with this mindset. Indeed, the uncertainty set $\mathcal{U}$ is, in some embodiments, in essence the disclosed threat model—it describes the potential modifications to the voting machine 165, which the adversary is able to choose between. By changing the uncertainty set, this formulation can flexibly substitute any number of threat models, and describe the goal of a L&A deck preparation algorithm under those constraints.

From the perspective of perspective of election administrators, U.S. elections are an enormously complicated endeavor, conducted in parallel by thousands of local officials across the country. Across so diverse and decentralized a system, even marginal increases to the difficulty or complexity of election procedures carry a very high associated cost. This cautions against testing procedures which are substantially more difficult or resource intensive than those already in use.

From an implementation standpoint, robust logic and accuracy testing aims to minimize the burden the solution confers to election administrators. The computer algorithm used to generate the deck can be run automatically at many stages (such as in the vendor provided Election Management System (EMS), by a third-party printing company, etc.) using the information systems that election administrators already have in place. Moreover, using a computer algorithm can relieve election workers from the arduous task of manually constructing test decks when applicable.

A key potential downside to election administrators comes from the length of the test decks. If the length of the test decks produced by the robust optimization problem (RO) is much greater than the current length of test decks, then it might increase the time it takes to fill out and insert the decks into a machine. Therefore, a relevant question asks whether the test decks produced by (RO) will be infeasibly long for reasonable choices of uncertainty sets. One answer disclosed herein to this question is surprising and found in later sections.

From a policy maker perspective, robust logic and accuracy testing is ideal because it allows them to specify the uncertainty set that they want testing to defeat. They can make this decision based on their evaluation of the cost-security trade-offs for their own state or jurisdiction, and based on factors like the known traits of the systems used in their elections.

From a voter perspective, voters want to know if voting machines are secure. When the test decks are released publicly and when the testing procedure is performed in public, voters can be assured that the voting machine 165 is not misconfigured in any of the ways specified by the uncertainty set $\mathcal{U}$.

Some embodiments advantageously achieve improved security through robust logic and accuracy testing by constructing an appropriate uncertainty set $\mathcal{U}$ (e.g., a class of attack codes, such as one-to-one transposition attack codes, one-to-many transposition attack codes, many-to-one transposition attack codes, etc., as described elsewhere herein). If the uncertainty set accounts for only a small number of possible misconfigurations or errors, then the security guarantees afforded by robust logic and accuracy testing will be limited. On the other hand, if the uncertainty set is overly expansive, then (RO) might yield an infeasibly long test deck, or might not even be solvable. The task of choosing an uncertainty set that strikes an appropriate balance between the expressiveness and conservatism is a central problem to applications of the methodology of robust optimization.

The uncertainty set(s) may be stored in the memory 122, the voting information database 118, and/or the external voting information database 180.

In some embodiments, the uncertainty set $\mathcal{U}$ is a transposition uncertainty set (e.g., the class of attack codes is a transposition class of attack codes). In some examples, the transposition uncertainty set includes all malfunctions of a voting machine 165 that swap the votes of candidates within and across any number of contests. More precisely, the transposition uncertainty set may include all of the possible flawed bijections from voting targets on a ballot to candidates (see, e.g., the example of FIG. 3). The formal statement of the transposition uncertainty will be discussed later in this disclosure.

Selecting the uncertainty set to be a transposition uncertainty set is advantageous for several reasons. Errors, such as transposition errors, may be introduced through simple misconfiguration of election machines, either by unintentional error, or intentional misconduct. Moreover, this threat is known to those who may desire to disrupt United States election systems.

Despite this risk, current L&A practice does not protect against this threat. While some states have procedures that protect against target swaps within a given contest, no state's procedures can reliably detect swaps between candidates in different contests. Solving (RO) under this uncertainty set in a way that produces usable test decks therefore would present a significant opportunity to improve on current election security practice, and provide an illustrative study into the potential for methods of this nature to strengthen U.S. election administration.

The following discussion formalizes the transposition uncertainty set, in an example. Let $\Sigma$ denote the set of all non-identity bijections of the form $\sigma: \mathcal{N} \to \mathcal{N}$, where we say that the function $\sigma(\bullet)$ is a non-identity bijection if and only if the function satisfies the following two criteria:
1. For every candidate $j \in \mathcal{N}$ in the election, there exists one target $i \in \mathcal{N}$ such that $\sigma(i)=j$.
2. There exists a location $i \in \mathcal{N}$ such that $\sigma(i) \neq i$.

Each function $\sigma: \mathcal{N} \to \mathcal{N}$ may be visualized as a mapping from locations on a ballot to the candidates who receive votes when the locations are marked. The set of all possible swaps is $$\mathcal{U} \triangleq \{T^\sigma(\bullet) \equiv (T_1^\sigma(\bullet), \ldots, T_N^\sigma(\bullet)) : \sigma \in \Sigma\}$$

where the following equality holds for each candidate $i \in \mathcal{N}_C$ in each contest $c \in \mathcal{C}$:

$$T_i^\sigma(\beta_1, \ldots, \beta_B) \triangleq \sum_{b=1}^{B} \mathbb{1}\left\{ \begin{array}{l} \text{there exists } j \in \beta_b \text{ such that } \sigma(j) = i \\ \text{and } |\{j \in \beta_b : \sigma(j) \in \mathcal{N}_c\}| \leq v_c \end{array} \right\}$$

The proper functioning of a machine can be thought of as this same tally equation parameterized by the identity function $*: \mathcal{N} \to \mathcal{N}$ such that for all i in $\mathcal{N}$, there is $*(i)=i$. One goal of (RO) under this uncertainty set is to find the minimum-length test deck $(\beta_1, \ldots, \beta_B)$ such that for all $\sigma \in \Sigma$, there is $T^*(\beta_1, \ldots, \beta_B) \neq T^\sigma(\beta_1, \ldots, \beta_B)$.

ADDITIONAL EXEMPLARY EMBODIMENTS

Aspect 1. A computer-implemented method for use in checking a voting system, the method comprising:
receiving, via one or more processors, election information comprising information of: (i) contests of an election, and (ii) at least one candidate for each contest;
generating, via the one or more processors, an attack code subset from a class of attack codes based on the: (i) contests of the election, and (ii) at least one candidate for each contest; and
until a second algorithm determines that a minimum test deck comprising a plurality of ballots may not be defeated by the attack code subset, at each iteration of a plurality of iterations:
routing, via the one or more processors, the attack code subset into a first algorithm to determine the minimum test deck configured to defeat the attack code subset;
routing, via the one or more processors, the minimum test deck into the second algorithm to determine an additional attack code that defeats the determined minimum test deck; and
updating, via the one or more processors, the attack code subset to include the additional attack code.

Aspect 2. The computer-implemented method of aspect 1, wherein the attack code subset includes at least one attack code that switches candidates across contests.

Aspect 3. The computer-implemented method of any one of aspects 1-2, wherein the second algorithm determines the additional attack code by evaluating candidate switches across contests.

Aspect 4. The computer-implemented method of any one of aspects 1-3, wherein the class of attack codes comprises: one-to-one transposition attack codes; one-to-many transposition attack codes; or many-to-one transposition attack codes.

Aspect 5. The computer-implemented method of any one of aspects 1-4, wherein the first algorithm determines the minimum test deck such that each ballot in the minimum test deck does not include more votes for candidates in each respective contest than are allowed in each respective contest.

Aspect 6. The computer-implemented method of any one of aspects 1-5, wherein the determination of the additional attack code that defeats the determined minimum test deck comprises:
determining, via the one or more processors, that there is a plurality of additional attack codes that defeat the determined minimum test deck;
determining, via the one or more processors, a least complex attack code from the plurality of additional attack codes, wherein the least complex attack code is an attack code that switches a smallest number of candidates relative to numbers of candidates switched by respective attack codes of the plurality of additional attack codes; and
determining, via the one or more processors, the additional attack code to be the least complex attack code.

Aspect 7. The computer-implemented method of any one of aspects 1-6, wherein the determination of the additional attack code that defeats the determined minimum test deck comprises:
determining, via the one or more processors, that there is a plurality of additional attack codes that defeat the determined minimum test deck;
determining, via the one or more processors, a set of least complex attack codes from the plurality of additional attack codes, wherein the set of least complex attack codes comprise attack codes that switch a smallest number of candidates relative to numbers of candidates switched by respective attack codes of the plurality of additional attack codes; and
determining, via the one or more processors, the additional attack code randomly from the determined set of least complex attack codes.

Aspect 8. The computer-implemented method of any one of aspects 1-7, wherein the first algorithm determines the minimum test deck according to a state government rule, the state government rule including a requirement for: (i) including a blank ballot, and/or (ii) a ballot including votes for every candidate.

Aspect 9. The computer-implemented method of any of aspects 1-8, further comprising selecting, via the one or more processors, the class of attack codes based on type of a voting machine.

Aspect 10. The computer-implemented method of any one of aspects 1-9, further comprising:
upon the second algorithm determining that the minimum test deck may not be defeated by the attack code subset, controlling, via the one or more processors, a ballot printer to print a paper copy of the minimum test deck; and
feeding the paper copy of the minimum test deck into a voting machine to check the voting machine.

Aspect 11. The computer-implemented method of any one of aspects 1-10, wherein the first algorithm determines the minimum test deck according to the equation:

$$\underset{B \in \mathbb{N}, (\beta_1, \ldots, \beta_B) \in \mathcal{D}}{\text{minimize}} B$$

where:
B is a length of a test deck;
$\beta$ is a ballot;
$(\beta_1, \ldots, \beta_B)$ is a deck of ballots; and
$\mathcal{D}$ is a set of test decks that satisfy requirements for a particular jurisdiction.

Aspect 12. A computer-implemented method for use in checking a voting system, the method comprising:
receiving, via one or more processors, election information comprising information of: (i) contests of an election, and (ii) at least one candidate for each contest;
generating, via the one or more processors, an attack code subset from a class of attack codes based on the: (i) contests of the election, and (ii) at least one candidate for each contest;
routing, via the one or more processors, the attack code subset into a first algorithm to determine a minimum test deck configured to defeat the attack code subset, wherein the minimum test deck comprises a plurality of ballots;
routing, via the one or more processors, the minimum test deck into a second algorithm to determine an additional attack code that defeats the determined minimum test deck;
updating, via the one or more processors, the attack code subset to include the additional attack code; and
routing, via the one or more processors, the updated attack code subset into the first algorithm to determine an updated minimum test deck configured to defeat the updated attack code subset.

Aspect 13. The computer-implemented method of aspect 12, wherein the first algorithm determines the minimum test deck such that each ballot in the minimum test deck does not include more votes for candidates in each respective contest than are allowed in each respective contest.

Aspect 14. The computer-implemented method of any one of aspects 12-13, wherein the determination of the additional attack code that defeats the determined minimum test deck comprises:
determining, via the one or more processors, that there is a plurality of additional attack codes that defeat the determined minimum test deck;
determining, via the one or more processors, a least complex attack code from the plurality of additional attack codes, wherein the least complex attack code is an attack code that switches a smallest number of candidates relative to numbers of candidates switched by respective attack codes of the plurality of additional attack codes; and
determining, via the one or more processors, the additional attack code to be the least complex attack code.

Aspect 15. The computer-implemented method of any one of aspects 12-14, wherein the determination of the additional attack code that defeats the determined minimum test deck comprises:
determining, via the one or more processors, that there is a plurality of additional attack codes that defeat the determined minimum test deck;
determining, via the one or more processors, a set of least complex attack codes from the plurality of additional attack codes, wherein the set of least complex attack codes comprise attack codes that switch a smallest number of candidates relative to numbers of candidates switched by respective attack codes of the plurality of additional attack codes; and
determining, via the one or more processors, the additional attack code randomly from the determined set of least complex attack codes.

Aspect 16. A system for error detection, the system comprising:
one or more processors; and
one or more memories;
the one or more memories having stored thereon computer-executable instructions that, when executed by the one or more processors, cause the computing device to:
receive election information comprising information of: (i) contests of an election, and (ii) at least one candidate for each contest;
generate an attack code subset from a class of attack codes based on the: (i) contests of the election, and (ii) at least one candidate for each contest; and
until a second algorithm determines that a minimum test deck comprising a plurality of ballots may not be defeated by the attack code subset, at each iteration of a plurality of iterations:
route the attack code subset into a first algorithm to determine the minimum test deck configured to defeat the attack code subset;
route the minimum test deck into the second algorithm to determine an additional attack code that defeats the determined minimum test deck; and
update the attack code subset to include the additional attack code.

Aspect 17. The system of aspect 16, further comprising:
a ballot printer configured to print ballots; and
wherein the one or more memories having stored thereon computer executable instructions that, when executed by the one or more processors, cause the computing device to:
upon the second algorithm determining that the minimum test deck may not be defeated by the attack code subset, control the ballot printer to print a paper copy of the minimum test deck.

Aspect 18. The system of any one of aspects 16-17, wherein the attack code subset includes at least one attack code that switches candidates across contests.

Aspect 19. The system of any one of aspects 16-18, wherein the second algorithm is configured to determine the additional attack code by evaluating candidate switches across contests.

Aspect 20. The system of any one of aspects 16-19, wherein the class of attack codes comprises: one-to-one transposition attack codes; one-to-many transposition attack codes; or many-to-one transposition attack codes.

Other Matters

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Furthermore, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method for use in checking a voting system, the method comprising:
   receiving, via one or more processors, election information comprising information of: (i) contests of an election, and (ii) at least one candidate for each contest;
   generating, via the one or more processors, an attack code subset from a class of attack codes based on the: (i) contests of the election, and (ii) at least one candidate for each contest; and
   until a second algorithm determines that a minimum test deck comprising a plurality of ballots may not be defeated by the attack code subset, at each iteration of a plurality of iterations:
   routing, via the one or more processors, the attack code subset into a first algorithm to determine the minimum test deck configured to defeat the attack code subset;
   routing, via the one or more processors, the minimum test deck into the second algorithm to determine an additional attack code that defeats the determined minimum test deck; and
   updating, via the one or more processors, the attack code subset to include the additional attack code.

2. The computer-implemented method of claim 1, wherein the attack code subset includes at least one attack code that switches candidates across contests.

3. The computer-implemented method of claim 1, wherein the second algorithm determines the additional attack code by evaluating candidate switches across contests.

4. The computer-implemented method of claim 1, wherein the class of attack codes comprises: one-to-one transposition attack codes; one-to-many transposition attack codes; or many-to-one transposition attack codes.

5. The computer-implemented method of claim 1, wherein the first algorithm determines the minimum test deck such that each ballot in the minimum test deck does not include more votes for candidates in each respective contest than are allowed in each respective contest.

6. The computer-implemented method of claim 1, wherein the determination of the additional attack code that defeats the determined minimum test deck comprises:
   determining, via the one or more processors, that there is a plurality of additional attack codes that defeat the determined minimum test deck;
   determining, via the one or more processors, a least complex attack code from the plurality of additional attack codes, wherein the least complex attack code is an attack code that switches a smallest number of candidates relative to numbers of candidates switched by respective attack codes of the plurality of additional attack codes; and determining, via the one or more processors, the additional attack code to be the least complex attack code.

7. The computer-implemented method of claim 1, wherein the determination of the additional attack code that defeats the determined minimum test deck comprises:

determining, via the one or more processors, that there is a plurality of additional attack codes that defeat the determined minimum test deck;

determining, via the one or more processors, a set of least complex attack codes from the plurality of additional attack codes, wherein the set of least complex attack codes comprise attack codes that switch a smallest number of candidates relative to numbers of candidates switched by respective attack codes of the plurality of additional attack codes; and determining, via the one or more processors, the additional attack code randomly from the determined set of least complex attack codes.

8. The computer-implemented method of claim 1, wherein the first algorithm determines the minimum test deck according to a state government rule, the state government rule including a requirement for: (i) including a blank ballot, and/or (ii) a ballot including votes for every candidate.

9. The computer-implemented method of claim 1, further comprising selecting, via the one or more processors, the class of attack codes based on type of a voting machine.

10. The computer-implemented method of claim 1, further comprising:

upon the second algorithm determining that the minimum test deck may not be defeated by the attack code subset, controlling, via the one or more processors, a ballot printer to print a paper copy of the minimum test deck; and feeding the paper copy of the minimum test deck into a voting machine to check the voting machine.

11. The computer-implemented method of claim 1, wherein the first algorithm determines the minimum test deck according to the equation:

$$\underset{B \in \mathbb{N}, (\beta_1, \ldots, \beta_B) \in \mathcal{D}}{\text{minimize}} \quad B$$

where:

B is a length of a test deck;

$\beta$ is a ballot;

$(\beta_1, \ldots, \beta_B)$ is a deck of ballots; and $\mathcal{D}$ is a set of test decks that satisfy requirements for a particular jurisdiction.

12. A computer-implemented method for use in checking a voting system, the method comprising:

receiving, via one or more processors, election information comprising information of: (i) contests of an election, and (ii) at least one candidate for each contest;

generating, via the one or more processors, an attack code subset from a class of attack codes based on the: (i) contests of the election, and (ii) at least one candidate for each contest;

routing, via the one or more processors, the attack code subset into a first algorithm to determine a minimum test deck configured to defeat the attack code subset, wherein the minimum test deck comprises a plurality of ballots;

routing, via the one or more processors, the minimum test deck into a second algorithm to determine an additional attack code that defeats the determined minimum test deck;

updating, via the one or more processors, the attack code subset to include the additional attack code; and routing, via the one or more processors, the updated attack code subset into the first algorithm to determine an updated minimum test deck configured to defeat the updated attack code subset.

13. The computer-implemented method of claim 12, wherein the first algorithm determines the minimum test deck such that each ballot in the minimum test deck does not include more votes for candidates in each respective contest than are allowed in each respective contest.

14. The computer-implemented method of claim 12, wherein the determination of the additional attack code that defeats the determined minimum test deck comprises:

determining, via the one or more processors, that there is a plurality of additional attack codes that defeat the determined minimum test deck;

determining, via the one or more processors, a least complex attack code from the plurality of additional attack codes, wherein the least complex attack code is an attack code that switches a smallest number of candidates relative to numbers of candidates switched by respective attack codes of the plurality of additional attack codes; and determining, via the one or more processors, the additional attack code to be the least complex attack code.

15. The computer-implemented method of claim 12, wherein the determination of the additional attack code that defeats the determined minimum test deck comprises:

determining, via the one or more processors, that there is a plurality of additional attack codes that defeat the determined minimum test deck;

determining, via the one or more processors, a set of least complex attack codes from the plurality of additional attack codes, wherein the set of least complex attack codes comprise attack codes that switch a smallest number of candidates relative to numbers of candidates switched by respective attack codes of the plurality of additional attack codes; and determining, via the one or more processors, the additional attack code randomly from the determined set of least complex attack codes.

16. A system for error detection, the system comprising:

one or more processors; and one or more memories;

the one or more memories having stored thereon computer-executable instructions that, when executed by the one or more processors, cause the system to:

receive election information comprising information of: (i) contests of an election, and (ii) at least one candidate for each contest;

generate an attack code subset from a class of attack codes based on the: (i) contests of the election, and (ii) at least one candidate for each contest; and until a second algorithm determines that a minimum test deck comprising a plurality of ballots may not be defeated by the attack code subset, at each iteration of a plurality of iterations:

route the attack code subset into a first algorithm to determine the minimum test deck configured to defeat the attack code subset;

route the minimum test deck into the second algorithm to determine an additional attack code that defeats the determined minimum test deck; and update the attack code subset to include the additional attack code.

17. The system of claim 16, further comprising:

a ballot printer configured to print ballots; and wherein the one or more memories having stored thereon computer executable instructions that, when executed by the one or more processors, cause the system to:

upon the second algorithm determining that the minimum test deck may not be defeated by the attack code subset, control the ballot printer to print a paper copy of the minimum test deck.

18. The system of claim 16, wherein the attack code subset includes at least one attack code that switches candidates across contests.

19. The system of claim 16, wherein the second algorithm is configured to determine the additional attack code by evaluating candidate switches across contests.

20. The system of claim 16, wherein the class of attack codes comprises: one-to-one transposition attack codes; one-to-many transposition attack codes; or many-to-one transposition attack codes.

* * * * *